US006735573B1

(12) United States Patent
Gelman et al.

(10) Patent No.: US 6,735,573 B1
(45) Date of Patent: May 11, 2004

(54) LEASE TERMINATION METHOD

(75) Inventors: Bernard Gelman, Philadelphia, PA (US); James Joseph Broussard, Drexel Hill, PA (US)

(73) Assignee: Dynamic Risk Assumption, Inc., Philadelphia, PA (US)

( * ) Notice: Subject to any disclaimer, the term of this patent is extended or adjusted under 35 U.S.C. 154(b) by 454 days.

(21) Appl. No.: 09/589,701

(22) Filed: Jun. 8, 2000

Related U.S. Application Data

(63) Continuation-in-part of application No. 09/460,601, filed on Dec. 14, 1999, now Pat. No. 6,647,375.

(51) Int. Cl.[7] .............................................. G06F 17/60
(52) U.S. Cl. .............................. 705/30; 705/4; 705/31; 705/40
(58) Field of Search .............................. 705/30, 35, 37, 705/4, 31, 40; 340/825.27, 825.26

(56) References Cited

U.S. PATENT DOCUMENTS

| 4,642,768 | A | 2/1987 | Roberts |
| 4,648,038 | A | 3/1987 | Roberts et al. |
| 4,722,055 | A | 1/1988 | Roberts |
| 4,752,877 | A | 6/1988 | Roberts et al. |
| 4,839,804 | A | 6/1989 | Roberts et al. |
| 4,851,999 | A | 7/1989 | Moriyama |
| 5,083,270 | A | 1/1992 | Gross et al. |
| 5,237,500 | A | 8/1993 | Perg et al. |
| 5,291,398 | A | 3/1994 | Hagan |
| 5,390,113 | A | 2/1995 | Sampson |
| 5,479,344 | A | 12/1995 | Keziah, Jr. |
| 5,704,045 | A | 12/1997 | King et al. |

(List continued on next page.)

FOREIGN PATENT DOCUMENTS

| WO | WO 96/21903 | * | 7/1996 | ........... G06F/17/60 |
| WO | WO 00/43937 | * | 7/2000 | |

OTHER PUBLICATIONS

Beresford, Dennis R; Statement of Financial Accounting Standards No. 125—accounting for transfers and servicing of financial assets and extinguishments of liabilities; Journal of Accountancy; vol. 128 N 4; PP.: 118–123; Oct. 1966.*
Barron's Financial Guides, Dictionary of Finance and Investment Terms, Barron's Educational Series, Inc., Fifth Edition, 1998, pp. 324 & 414.*
Future, Options, & Swaps, Kolb, Richard, 1999.

Primary Examiner—Robert P. Olszewski
Assistant Examiner—Elaine Gort
(74) Attorney, Agent, or Firm—Caesar, Rivise, Bernstein, Cohen & Pokotilow, Ltd.

(57) ABSTRACT

A method for derecognizing the commitment of a lessor in an operating lease having a lease liability including the steps of holding by a lessee an operating lease wherein the operating lease has a future value $S_1$ and determining the present value $P_1$ of the operating lease in accordance with the future value $S_1$. The method also calls for buying the operating lease by a buyer entity for a value $P_2$ greater than the present value $P_1$, thereby providing a first net gain and holding the lease liability by the buyer entity for a period of time and discharging a lease liability of the operating lease at the end of the period of time for a value $S_1$ that is less than a future value $S_2$ thereby determining a second net gain. The present value $P_2$ is determined according to the present value $P_1$ and according to a time t years prior to the time at which the value of the lease liability reaches $S_1$. The present value $P_2$ is determined according to the value $S_2$ and the future value $S_1$ is known at the time of the determining of the present value $P_1$. The first net gain is a net gain for the seller and the second net gain is a net gain for the buyer entity. The lease liability is recorded as a long term debt by the seller and may be at present value by the buyer entity. The buyer entity can be an insurance company.

15 Claims, 1 Drawing Sheet

U.S. PATENT DOCUMENTS

| | | |
|---|---|---|
| 5,712,984 A | 1/1998 | Hammond et al. |
| 5,727,161 A | 3/1998 | Purcell, Jr. |
| 5,752,236 A | 5/1998 | Sexton et al. |
| 5,819,230 A | 10/1998 | Christie et al. |
| 5,911,136 A | 6/1999 | Atkins |
| 5,946,667 A | 8/1999 | Tull, Jr. et al. |
| 5,966,693 A | 10/1999 | Burgess |
| 6,026,364 A * | 2/2000 | Whitworth ............ 705/4 |
| 6,304,858 B1 | 10/2001 | Mosler et al. |

* cited by examiner

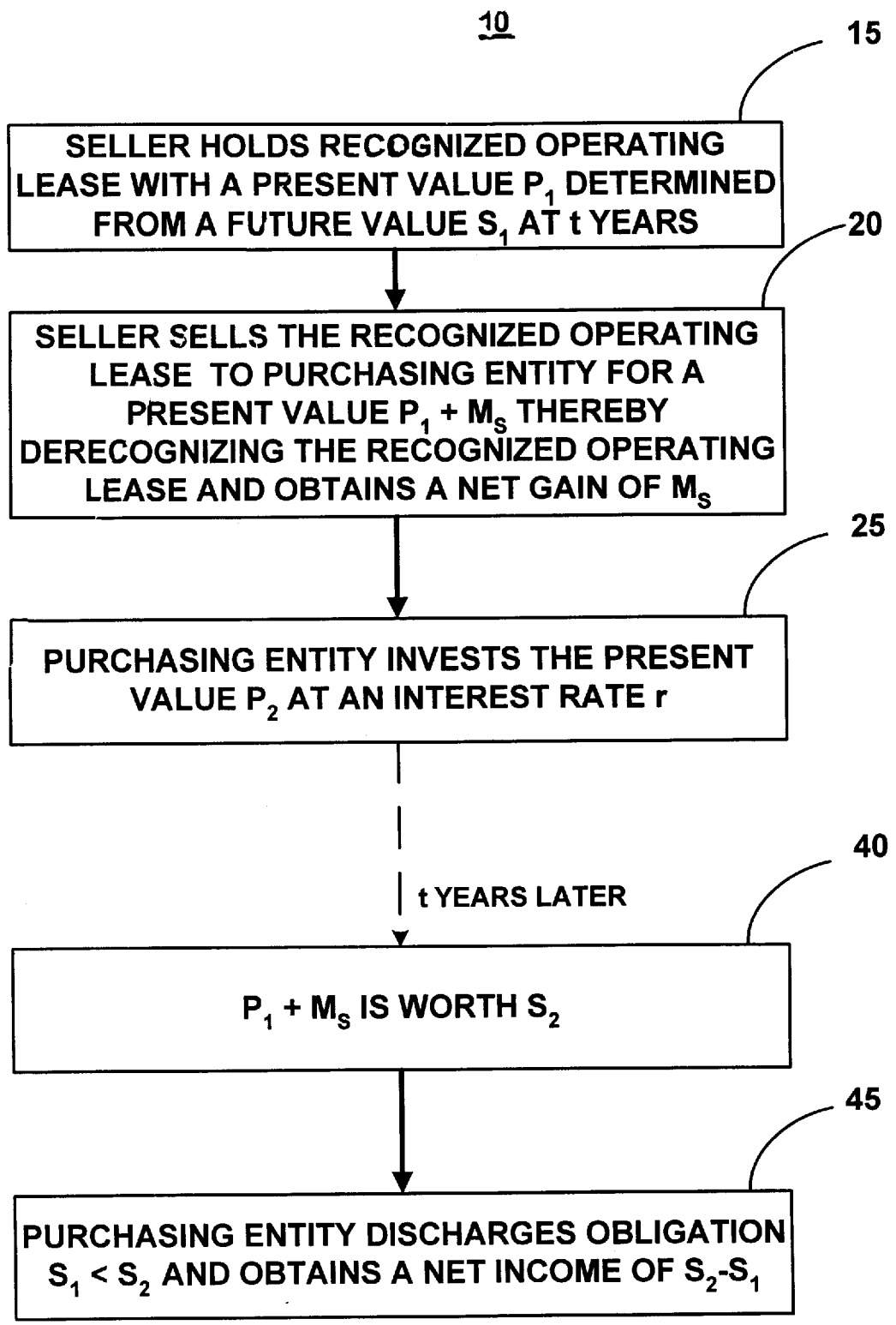

US 6,735,573 B1

LEASE TERMINATION METHOD

RELATED APPLICATION

This application is a continuation-in-part of U.S. patent application Ser. No. 09/460,601 filed Dec. 14, 1999 entitled "Risk Reduction System" now U.S. Pat. No. 6,647,375, which is assigned to the same assignee as this invention and whose disclosure is incorporated by reference herein.

FIELD OF THE INVENTION

This invention relates to the field of risk analysis and, in particular, to derecognition of the commitment of a lessee in an operating lease.

BACKGROUND OF THE INVENTION

In order to establish uniformity in financial statement presentation the American Institute of Certified Public Accountants (AICPA) has published many writings. These writings are collectively referred to as Generally Accepted Accounting Principals (GAAP). GAAP establishes how, where, when and how much is reported on a financial statement. GAAP is required to be used by most businesses but not all. There are some exceptions.

According to GAAP, liabilities must be recorded at their face value. Current liabilities are defined as those that should be paid in one year's time or less from the Balance Sheet date. Long term obligations are defined as those that are due to be paid after one year from the balance sheet date. For example, an account payable due in thirty (30) days for $100 would be recorded as a current liability of $100. In the case of a note payable due in ten (10) years the debt would be recorded as a long term debt.

Whether a debt is an account payable or a note, it is thus recorded at its face value. No consideration is made of the present value of a future obligation when recording the debt. In fact GAAP forbids the recordation of a liability for any amount other than its face amount. However it is well known that long term liabilities have a present value less than the face value at which they are recorded. Thus, the recorded value is greater than the actual present value but most companies must carry the greater value on their books in order to comply with GAAP.

Therefore, in order to avoid this inequity in GAAP some companies might find it desirable to sell one or more of its long term obligations for a sum that approximates the present value of this debt. In order to accomplish this objective the debtor must derecognize this liability. According to GAAP in order for a liability to be extinguished one of the following conditions must be met:

The debtor pays the creditor and is relieved of its obligation for the liability. Or, the debtor is legally released from being the primary obliger under the liability, either judicially or by the creditor.

Liabilities are defined by GAAP as "probable future sacrifices of economic benefits arising from present obligations of a particular entity to transfer assets or provide services to other entities in the future as a result of past transactions or events." Items that would otherwise be classified as a liability would not be recognized as a liability if insured under a contract of insurance with a recognized insurance carrier. An example would be a company that is self insured for worker's compensation. The company's future loss obligations would be reflected as a liability on its financial statement according to GAAP. If the company were to then purchase a workers' compensation insurance contract, the liability would be derecognized in exchange for the premium paid to the insurance carrier.

The purchaser of the debt would therefore have to be an insurance carrier. The purchaser of the debt must be able to make a profit otherwise there is no business purpose for them to enter into the transaction. The insurance company would therefore charge a premium in excess of the present value of the obligation. The total sum paid by the seller would still be less than the face amount. Both buyer and seller profit.

Additionally, long term operating lease commitments must be recorded at their face value. Furthermore, they must be disclosed in the footnotes of the financial statement of the company according to GAAP. Thus, no consideration is made of the present value of a future long term operating lease commitment. In fact GAAP forbids the recordation of a long term operating lease commitment for any amount other than its face amount. However it is well known that long term operating lease commitments have a present value less than the face value of which they are recorded. Thus, the recorded value is greater value is greater than the actual value but most companies must carry the greater value on their financial statements in order to comply with GAAP.

Therefore, in order to avoid this inequity in GAAP some companies might find it desirable to sell one or more of its long term operating lease commitments for a sum that approximates the present value of this commitment. In order to accomplish this objective the lessee must derecognize this commitment. According to GAAP in order for a commitment to be extinguished one of the following conditions must be met:

The lessee must pay the lessor and be relieved of its obligation for the commitment. Alternatively, the lessee must be legally released from being the primary obliger under the lease, either judicially or by the lessor.

Items that would otherwise be classified as a long term operating lease would not be recognized as a long term operating lease if insured under a contract of insurance with a recognized insurance carrier.

The purchaser of the long term operating lease would therefore have to be an insurance carrier. The purchaser of the long term operating lease must be able to make a profit other there is no business purpose for them to enter into the transaction. The insurance company would therefore charge a premium in excess of the present value of the total due on the long term operating lease. The total sum paid by the seller would still be less than the face amount. Both buyer and seller profit.

SUMMARY OF THE INVENTION

A method for derecognizing the commitment of a lessee in an operating lease having a lease liability including the steps of holding by a lessee an operating lease wherein the operating lease has a future value $S_1$ and determining the present value $P_1$ buying the operating lease by a buyer entity for a value $P_2$ greater than the present value $P_1$, thereby providing a first net gain and holding the lease liability by the buyer (entity for a period of time and discharging a lease liability of the operating lease at the end of the period of time for a value $S_1$ that is less than a future value $S_2$ thereby determining a second net gain. The present value $P_2$ is determined according to the present value $P_1$ and according to a time t years prior to the time at which the value of the lease liability reaches $S_1$. The present value $P_2$ is determined according to the value $S_2$ and the future value $S_1$ is known at the time of the determining of the present value $P_1$. The first net gain is a net gain for the seller and the second net gain is a net gain for the buyer entity. The buyer entity can be an insurance company.

DESCRIPTION OF THE DRAWING

The drawing shows the lease termination method of the present invention.

DESCRIPTION OF THE PREFERRED EMBODIMENT OF THE INVENTION

It is well known that GAAP does not permit most business entities to take into consideration the present value of a future long term lease commitment when recording their long term lease commitments in their financial statements. However, in accordance with the present invention, purchasing an insurance contract from a recognized insurance carrier can derecognize long term lease commitments.

Referring now to the drawing, there is shown risk reduction method 10 of the present invention for assisting in the sale of long term lease commitments. In risk reduction method 10 a business entity holds a long term lease commitment having a present value $P_1$ and a future value $S_1$ as shown in block 15. The long term lease commitment is due in t years. The present value $P_1$, the present value of the future value of $S_1$ as set forth in block 15, is the well known present value P which is determined from a known future value S in the manner set forth below. This determination is well understood by those skilled in the art. The equation for performing the calculation of the present value $P_1$ includes the rate of interest r and the amount of time the money is invested t.

In general, the present value P of a future obligation can be calculated from the well know equation for determining a future value S when a present value P is known:

$$S = P(1+r).$$

Performing a well known algebraic reduction yields:

$$S/(1+r) = P(1+r)/(1+r).$$

$$S/(1+r) = P.$$

Transposing the result of the algebraic reduction yields the equation for the present value P:

$$P = S(1+rt),$$

where P is thus the amount of money that must be invested at the present time in order to produce the known future value S after t years at a rate of interest r where r can be zero or any value greater than zero.

In accordance with the method of the present invention the holder of the long term operating lease sells the long term operating lease to a purchaser company that can eliminate long term operating leases as defined in GAAP. Since the seller of the long term operating lease no longer faces a future sacrifice of economic benefits due to the long term operating lease, the long term operating lease is derecognized for the seller.

The purchaser can, for example, be an insurance company or a consortium including an insurance company. Such an entity can be defined as the purchaser herein. The sale is performed for a value $P_2$ equal to the present value $P_1$ plus a profit margin $M_s$ for the seller as shown in block 20 of risk reduction method 10. As shown in block 25, the purchaser invests the received value $P_2$ for a period of t years at a rate of interest r. After t years of investment in this manner, the value $P_2 = P1 + M_s$ has grown to the value $S_2$ as shown in block 40. However, the purchaser only owes the face value $S_1$ at that time, where $S_1$ is less than $S_2$. Therefore, when the purchaser pays the obligation $S_1$ at the time, where $S_1$ is less than $S_2$. Therefore, when the purchaser pays the obligation $S_1$ it receives a net income of $S_2-S_1$ as shown in block 45.

As an example, consider the following. Assume the net present value of $100 due in ten (10) years is $30 in present dollars. Further assume that an insurance company purchases this long term operating lease in exchange for a payment from the seller of $45 in cash today. The long term operating leases of the seller are reduced by $100, cash is reduced by $45, and the seller recognizes prepaid insurance of $45. Instead of including a lease expense of $10 per year the seller will recognize insurance expense of $4.50 per year.

The buyer in this example receives $45 in the present. According to the assumption used above, $30 today is worth $100 in ten (10) years, $45 today is worth $150 in ten (10) years. Thus, in this example, the purchaser will discharge the long term lease commitment at its face value of $100 in ten (10) years and earn a profit of $50, the difference between $150 and $100. As this example shows both the buyer and seller can make a profit on the transaction.

It will be understood that the values of $P_1$, $P_2$ and $S_2$ depend on the interest rate r, which is unknown at the time of the sale set forth in block 20. Thus, the buyer incurs a risk in this method. However, the obligation is a known value $S_1$. This eliminates some of the underwriting risk.

An insurance company normally assumes two risks. One of the risks is a casualty risk similar to the risk involved in, for example, life or health insurance. This risk is eliminated in risk reduction method 10 because the amount of the liability and the date it comes due are both known. The other risk is the rate of return r. This risk continues to be borne by the insurance company.

Thus in risk reduction method 10, the insurance company performs its essential service, it underwrites a risk. At the same time the insurance company provides the insured with an opportunity to reduce its long term operating leases and increase net profit, and hence its net worth, increase their cash flow and improve their credit rating. Improving their credit rating can permit some companies to borrow working capital at lower rates thereby further increasing their profits, net worth and cash flow.

The purchaser benefits by increasing its total business with a known risk and a fixed dollar obligation and a known due date. Furthermore, in the case where the purchaser is an insurance company, the insurance premium is a single payment paid in advance. As previously described, the purchaser can be an insurance company a consortium including an insurance company or any other entity performing the operations described. Long term operating leases as used herein can include, without limitation, real estate, equipment, intellectual property, office space, retail outlets, or any long term operating lease commitment, a portion of which is due more than twelve months later in accordance with GAAP.

The advantages obtained in accordance with lease termination method 10 include the ability to utilize with a true tax lease where the lessor is unable to negotiate with a party, the ability to utilize with a lessor who is unable to negotiate a prepayment due to restrictions with their bank. Furthermore EBITDA is increased by decreasing lease expenses on an annual basis and public companies can improve earnings projections by decreasing their rental expenses, credit ratings are improved as banks and credit agencies include rental commitments from the footnotes to debt on the balance sheet in calculating ratios including debt such as debt/EBITDA. By improving the company's credit rating a nonbankable company could become bankable, a below investment grade company could become investment grade, or an investment grade company could increase its rating. All of the above items could lower the cost of money to the company. Thus, lease termination method 10 provides a means to fund debt through insurance finance companies if required. Additionally, it permits disposal of multiple leases with a single insurance contract and can eliminate negotiations with multiple lessors. It mitigates loss from bad lease and permits submitting of property, if allowed by lease, as the insurance company takes no interest in the leased premises.

Without further elaboration, the foregoing will so fully illustrate that others may, by applying current or future knowledge, readily adapt the same for use under various conditions of service.

What is claimed is:

1. A method for derecognizing the commitment of a lessee in an operating lease, comprising the steps of:
   (a) holding by a lessee a recognized operating lease wherein the recognized operating lease has an obligation to a lessor and the recognized operating lease has a fixed future value $S_1$;
   (b) determining the present value $P_1$ of the recognized operating lease in accordance with the fixed future value $S_1$;
   (c) buying the recognized operating lease from the lessee by a buyer entity for a present value $P_2$ greater than the present value $P_1$ wherein the lessee retains the obligation to the lessor thereby providing a first net gain to the lessee whereby the recognized operating lease is derecognized to provide a derecognized operating lease;
   (d) holding the derecognized operating lease and storing information regarding the derecognized operating lease in a computer by the buyer entity for a period of time; and
   (e) discharging a liability of the derecognized operating lease at the end of the period of time by the buyer entity for the future value $S_1$ that is less than a future value $S_2$ determined in accordance with the present value $P_2$ thereby providing a second net gain to the buyer entity.

2. The method for derecognizing the commitment of a lessee of claim 1, wherein the present value $P_2$ is determined according to the present value $P_1$.

3. The method for derecognizing the commitment of a lessee of claim 1, wherein the present value $P_1$ is determined according to a time t years prior to the time at which the value of the lessee retained obligation reaches $S_1$.

4. The method for derecognizing the commitment of a lessee of claim 3, wherein the buyer entity holds the lessee retained obligation for a period of time before selling the lessee retained obligation.

5. The method for derecognizing the commitment of a of claim 4, wherein the buyer entity sells the lessee retained obligation to a further buyer entity before t years from the purchase have elapsed.

6. The method for derecognizing the commitment of a lessee of claim 4, where the further buyer entity is an insurance company.

7. The method for derecognizing the commitment of a lessee of claim 4, wherein the buyer entity acquiring the lessee retained obligation at the present value $P_1$ sells the lessee retained obligation to a further buyer before t years from the purchase have elapsed.

8. The method for derecognizing the commitment of a lessee of claim 3, wherein the present value $P_2$ is determined according to the value $S_2$.

9. The method for derecognizing the commitment of a lessee of claim 1, wherein the future value $S_1$ is known at the time of the determining of the present value $P_1$.

10. The method for derecognizing the commitment of a lessee of claim 1, wherein the first net gain is a net gain for the lessee and the second net gain is a net gain for the buyer entity.

11. The method for derecognizing the commitment of a lessee of claim 1, wherein the lessee retained obligation is recorded as a long term commitment by the lessee and as a present value by the buyer entity.

12. The method for derecognizing the commitment of a lessee of claim 1, wherein the buyer entity comprises an insurance company.

13. The method for derecognizing the commitment of a lessee of claim 12, wherein the buyer entity comprises a consortium including an insurance company.

14. The method for derecognizing the commitment of a lessee of claim 1, wherein the first net gain comprises $M_s$.

15. The method for derecognizing the commitment of a lessee of claim 1, wherein the first net gain comprises a value greater than $M_s$.

* * * * *